US011976565B2

(12) United States Patent
Snider et al.

(10) Patent No.: US 11,976,565 B2
(45) Date of Patent: May 7, 2024

(54) NESTED DAMPER PIN AND VIBRATION DAMPENING SYSTEM FOR TURBINE NOZZLE OR BLADE

(71) Applicant: General Electric Company, Schenectady, NY (US)

(72) Inventors: Zachary John Snider, Simpsonville, SC (US); Brad Wilson VanTassel, Greer, SC (US); Brian Denver Potter, Greer, SC (US); John McConnell Delvaux, Fountain Inn, SC (US)

(73) Assignee: GE Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 17/815,372

(22) Filed: Jul. 27, 2022

(65) Prior Publication Data

US 2024/0035384 A1 Feb. 1, 2024

(51) Int. Cl.
*F01D 5/16* (2006.01)

(52) U.S. Cl.
CPC ............ *F01D 5/16* (2013.01); *F05D 2220/32* (2013.01); *F05D 2260/96* (2013.01)

(58) Field of Classification Search
CPC ........ F16F 7/02; F16F 7/04; F16F 7/06; F16F 7/08; F16F 15/129; F16F 15/1292;
(Continued)

(56) References Cited

U.S. PATENT DOCUMENTS 2,771,267 A * 11/1956 Weymouth, Jr. .......... F01D 5/24 416/196 R
3,881,844 A * 5/1975 Hennessey ............ F01D 5/3038 416/500
4,765,751 A * 8/1988 Pannone ................ G01K 13/02 374/135
5,284,011 A * 2/1994 Von Benken ........... F01D 9/041 415/119

(Continued)

FOREIGN PATENT DOCUMENTS

GB 1507811 A * 4/1978 ............... F01D 5/22
GB 2505172 A * 2/2014 ........... A44C 5/0046
JP 2014084676 A 5/2014

OTHER PUBLICATIONS

"Kennametal Introduces First Stellite Powder for Laser Powder Bed Additive Manufacturing" Apr. 6, 2021. Retreived on May 30, 2023 from www.kennametal.com/us/en/about-us/news/kennametal-news/stellite-powder-for-laser-powder-bed-additive-manufacturing.html (Year: 2021).*

*Primary Examiner* — Topaz L. Elliott
(74) *Attorney, Agent, or Firm* — James Pemrick; Charlotte Wilson; Hoffman Warnick LLC

(57) ABSTRACT

A vibration dampening system includes a vibration dampening element for a turbine nozzle or blade. A body opening extends through the turbine nozzle or blade, e.g., through the airfoil among potentially other parts of the nozzle or blade. A vibration dampening element includes a plurality of stacked damper pins within the body opening. The damper pins include an outer body having an inner opening, a first end surface and an opposing second end surface; and an inner body nested and movable within the inner opening of the outer body. The end surfaces frictionally engage to dampen vibration. The inner body has a first central opening including a first portion configured to engage an elongated body therein and an outer surface configured to frictionally engage a portion of the inner opening of the outer body to dampen vibration.

18 Claims, 10 Drawing Sheets

(58) Field of Classification Search
CPC ........ F16F 15/139; F01D 25/04; F01D 25/06; F01D 5/16; F01D 5/24
See application file for complete search history.

(56) References Cited

U.S. PATENT DOCUMENTS

| | | | | |
|---|---|---|---|---|
| 5,820,343 | A | 10/1998 | Kraft et al. | |
| 7,270,517 | B2 | 9/2007 | Garner | |
| 7,413,405 | B2 | 8/2008 | Busbey et al. | |
| 7,736,124 | B2 | 6/2010 | Bauer et al. | |
| 7,824,158 | B2 | 11/2010 | Bauer et al. | |
| 9,657,591 | B2 | 5/2017 | Schleif et al. | |
| 9,657,717 | B2 | 5/2017 | Ollgaard et al. | |
| 10,443,408 | B2 * | 10/2019 | Kareff | F01D 5/22 |
| 11,187,089 | B2 | 11/2021 | Wondrasek et al. | |
| 11,248,475 | B2 * | 2/2022 | Wondrasek | F01D 5/22 |
| 11,519,276 | B1 * | 12/2022 | Snider | F01D 5/16 |
| 11,572,791 | B1 * | 2/2023 | Snider | F01D 9/041 |
| 11,634,991 | B1 * | 4/2023 | Snider | F01D 9/02 415/1 |
| 2007/0251782 | A1 * | 11/2007 | Chen | F16F 7/123 188/377 |
| 2010/0232968 | A1 * | 9/2010 | Miller | F01D 5/26 416/190 |
| 2014/0147276 | A1 * | 5/2014 | Roberts, III | F01D 11/008 416/135 |
| 2019/0017402 | A1 * | 1/2019 | Martin, Jr. | F01D 11/006 |
| 2021/0172325 | A1 | 6/2021 | Wondrasek et al. | |
| 2021/0172326 | A1 * | 6/2021 | Wondrasek | F01D 5/22 |
| 2021/0254478 | A1 | 8/2021 | Chakrabarti et al. | |

* cited by examiner

NESTED DAMPER PIN AND VIBRATION DAMPENING SYSTEM FOR TURBINE NOZZLE OR BLADE

TECHNICAL FIELD

The disclosure relates generally to dampening vibration in a turbine nozzle or blade. More specifically, the disclosure relates to a vibration dampening system including a vibration dampening element using a plurality of damper pins. Each damper pin includes an inner body nested and movable within an outer body.

BACKGROUND

One concern in turbine operation is the tendency of the turbine blades or nozzles to undergo vibrational stress during operation. In many installations, turbines are operated under conditions of frequent acceleration and deceleration. During acceleration or deceleration of the turbine, the airfoils of the blades are, momentarily at least, subjected to vibrational stresses at certain frequencies and in many cases to vibrational stresses at secondary or tertiary frequencies. Nozzle airfoils experience similar vibrational stress. Variations in gas temperature, pressure, and/or density, for example, can excite vibrations throughout the rotor assembly, especially within the nozzle or blade airfoils. Gas exiting upstream of the turbine and/or compressor sections in a periodic, or "pulsating," manner can also excite undesirable vibrations. When an airfoil is subjected to vibrational stress, its amplitude of vibration can readily build up to a point which may negatively affect gas turbine operations and/or component life. Stacked, solid damper pins in a turbine blade have been used to dampen vibration, but the centrifugal forces can result in locking of the damper pins together, reducing their ability to dampen vibration.

BRIEF DESCRIPTION

All aspects, examples and features mentioned below can be combined in any technically possible way.

An aspect of the disclosure provides a damper pin for a vibration dampening system for a turbine nozzle or blade, the damper pin comprising: an outer body having an inner opening, a first end surface and an opposing second end surface; and an inner body nested and movable within the inner opening of the outer body, the inner body having a first central opening including a first portion configured to engage an elongated body therein and an outer surface configured to frictionally engage a portion of the inner opening of the outer body.

Another aspect of the disclosure includes any of the preceding aspects, and the outer surface of the inner body has a pear shape including a bulbous base portion and a narrower neck portion, wherein the narrower neck portion includes the first portion of the first central opening.

Another aspect of the disclosure includes any of the preceding aspects, and the bulbous base portion includes a second portion of the first central opening, the second portion distanced from the elongated body.

Another aspect of the disclosure includes any of the preceding aspects, and the inner opening of the outer body has a shape configured to receive the pear shape of the outer surface of the inner body and to allow frictional engagement between the inner body and the outer body under influence of the elongated body on the inner body.

Another aspect of the disclosure includes any of the preceding aspects, and the first end surface of the outer body is at least partially concave, and the second end surface of the outer body is at least partially convex, whereby the first end surface and the second end surface of adjacent damper pins frictionally engage.

Another aspect of the disclosure includes any of the preceding aspects, and the outer body further includes a second central opening extending through the first end surface and the second end surface, the second central opening being configured to allow the elongated body to extend therethrough.

Another aspect of the disclosure includes any of the preceding aspects, and the outer body and the inner body are additively manufactured, and wherein, prior to separation after the additive manufacturing, the outer body and the inner body are integrally coupled and fixed relative to one another by a removable coupling element.

Another aspect of the disclosure includes any of the preceding aspects, and the inner body includes a planar washer member, and the outer body includes a cup member configured to receive the planar washer member.

An aspect of the disclosure relates to a vibration dampening system for a turbine nozzle or blade, the vibration dampening system comprising: a plurality of stacked damper pins, each damper pin including: an outer body having an inner opening, a first end surface and an opposing second end surface; and an inner body nested and movable within the inner opening of the outer body, the inner body having a first central opening and an outer surface configured to frictionally engage a portion of the inner opening of the outer body; and an elongated body extending in a body opening of the turbine nozzle or blade and engaged within a first portion of the first central opening of each inner body.

Another aspect of the disclosure includes any of the preceding aspects, and the outer surface of the inner body has a pear shape including a bulbous base portion and a narrower neck portion, wherein the narrower neck portion includes the first portion of the first central opening.

Another aspect of the disclosure includes any of the preceding aspects, and the bulbous base portion includes a second portion of the first central opening, the second portion distanced from the elongated body.

Another aspect of the disclosure includes any of the preceding aspects, and the inner opening of the outer body has a shape configured to receive the pear shape of the outer surface of the inner body and to allow frictional engagement between the inner body and the outer body under influence of the elongated body on the inner body.

Another aspect of the disclosure includes any of the preceding aspects, and the first end surface and the second end surface of adjacent damper pins of the plurality of stacked damper pins frictionally engage.

Another aspect of the disclosure includes any of the preceding aspects, and the outer body further includes a second central opening extending through the first end surface and the second end surface, the second central opening being configured to allow the elongated body to extend therethrough.

Another aspect of the disclosure includes any of the preceding aspects, and the outer body and the inner body are additively manufactured, and wherein, prior to separation after the additive manufacturing, the outer body and the inner body are integrally coupled and fixed relative to one another by a removable coupling element.

Another aspect of the disclosure includes any of the preceding aspects, and further comprising a retention damper pin on an end of the elongated body, the retention damper pin engaging with an endmost one of the plurality of stacked damper pins.

Another aspect of the disclosure includes any of the preceding aspects, and the inner body includes a planar washer member, and the outer body includes a cup member configured to receive the planar washer member.

An aspect of the disclosure includes a method of dampening vibration in a turbine nozzle or blade, the method comprising: during operation of the turbine nozzle or blade: dampening vibration by frictional engagement between and within a plurality of stacked damper pins, each damper pin including: an outer body having an inner opening, a first end surface and an opposing second end surface, wherein first vibration dampening occurs by frictional engagement of the first end surface and the opposing second end surface of adjacent damper pins; and an inner body nested and movable within the inner opening of the outer body, wherein second vibration dampening occurs by frictional engagement of a portion of an outer surface of the inner body and a portion of the inner opening of the outer body under influence of an elongated body engaged with the inner body.

Another aspect of the disclosure includes any of the preceding aspects, and further comprising third dampening vibration by deflection of the elongated body disposed radially in a body opening extending in a body of the turbine nozzle or blade.

Another aspect of the disclosure includes any of the preceding aspects, and further comprising fourth dampening vibration by frictional engagement of an outer dimension of the outer body with an inner dimension of an inner surface of the body opening in the turbine nozzle or blade.

Two or more aspects described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
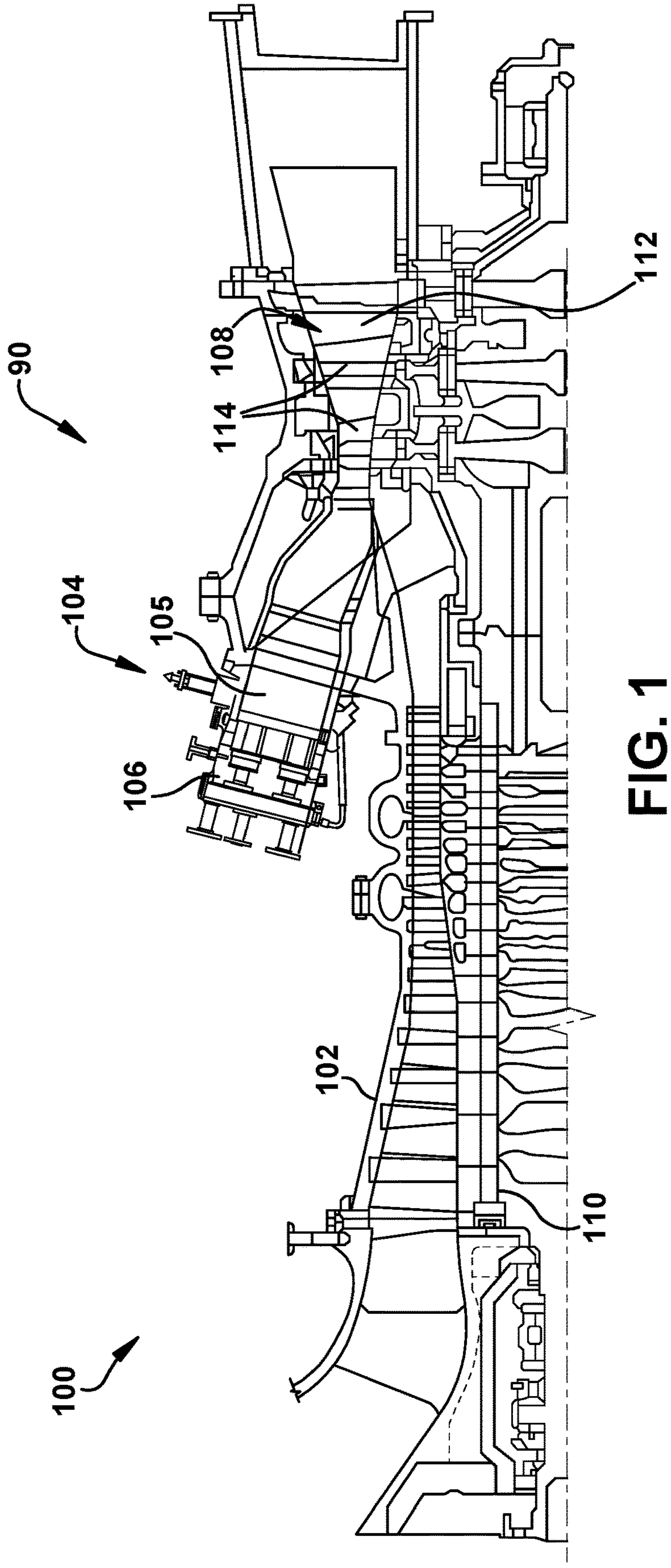
FIG. 1 shows a cross-sectional view of an illustrative turbomachine in the form of a gas turbine system.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION

As an initial matter, in order to clearly describe the subject matter of the current disclosure, it will become necessary to select certain terminology when referring to and describing relevant machine components within a turbine. To the extent possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. It is often required to describe parts that are disposed at different radial positions with regard to a center axis. The term "radial" refers to movement or position perpendicular to an axis. For example, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms may be applied in relation to the center axis of the turbine.

In addition, several descriptive terms may be used regularly herein, as described below. The terms "first," "second," and "third," may be used interchangeably to distinguish one component from another and are not intended to signify location or importance of the individual components.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof. "Optional" or "optionally" means that the subsequently described event or circumstance may or may not occur or that the subsequently described component or element may or may not be present, and that the description includes instances where the event occurs or the component is present and instances where it does not or is not present.

Where an element or layer is referred to as being "on," "engaged to," "connected to" or "coupled to" another element or layer, it may be directly on, engaged to, connected to, or coupled to the other element or layer, or intervening elements or layers may be present. In contrast, when an element is referred to as being "directly on," "directly engaged to," "directly connected to" or "directly coupled to" another element or layer, there are no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Embodiments of the disclosure provide a vibration dampening system including a vibration dampening element for a turbine nozzle or blade. A body opening extends through the turbine nozzle or blade, e.g., through the airfoil among potentially other parts of the nozzle or blade. A vibration dampening element includes a plurality of stacked damper pins within the body opening. Each damper pin includes an outer body having an inner opening, a first end surface, and an opposing second end surface; and an inner body nested and movable within the inner opening of the outer body. Hence, the damper pins may be referenced as 'nested damper pins' because they include nested parts that frictionally engage with each other to dampen vibration. In addition, the end surfaces of the outer bodies of adjacent damper pins frictionally engage with adjacent damper pins to dampen vibration. The inner body has a first central opening including a first portion configured to engage an elongated body therein. The inner body also includes an outer surface configured to frictionally engage a portion of the inner opening of the outer body to dampen vibration.

The vibration dampening system reduces nozzle or blade vibration with a simple arrangement and does not add much extra mass to the nozzle or blade. Accordingly, the vibration dampening element does not increase centrifugal force to the nozzle base end or blade tip end or require a change in nozzle or blade configuration. The nested damper pins allow use of stacked damper pins in which the inner bodies thereof are free to continue frictional-based vibration dampening movement (via interaction with the elongated body) even if the end surfaces of the outer bodies lock together, e.g., as may occur in turbine blades as a result of centrifugal forces.

Referring to the drawings, FIG. 1 is a cross-sectional view of an illustrative machine including a turbine(s) to which teachings of the disclosure can be applied. In FIG. 1, a turbomachine 90 in the form of a combustion turbine or gas turbine (GT) system 100 (hereinafter, "GT system 100") is shown. GT system 100 includes a compressor 102 and a combustor 104. Combustor 104 includes a combustion region 105 and a fuel nozzle section 106. GT system 100 also includes a turbine 108 and a common compressor/turbine shaft 110 (hereinafter referred to as "rotor 110").

GT system 100 may be a 7HA.03 engine, commercially available from General Electric Company, Greenville, S.C. The present disclosure is not limited to any one particular GT system and may be implemented in connection with other engines including, for example, the other HA, F, B, LM, GT, TM and E-class engine models of General Electric Company and engine models of other companies. More importantly, the teachings of the disclosure are not necessarily applicable to only a turbine in a GT system and may be applied to practically any type of industrial machine or other turbine, e.g., steam turbines, jet engines, compressors (as in FIG. 1), turbofans, turbochargers, etc. Hence, reference to turbine 108 of GT system 100 is merely for descriptive purposes and is not limiting.

Figure 2:
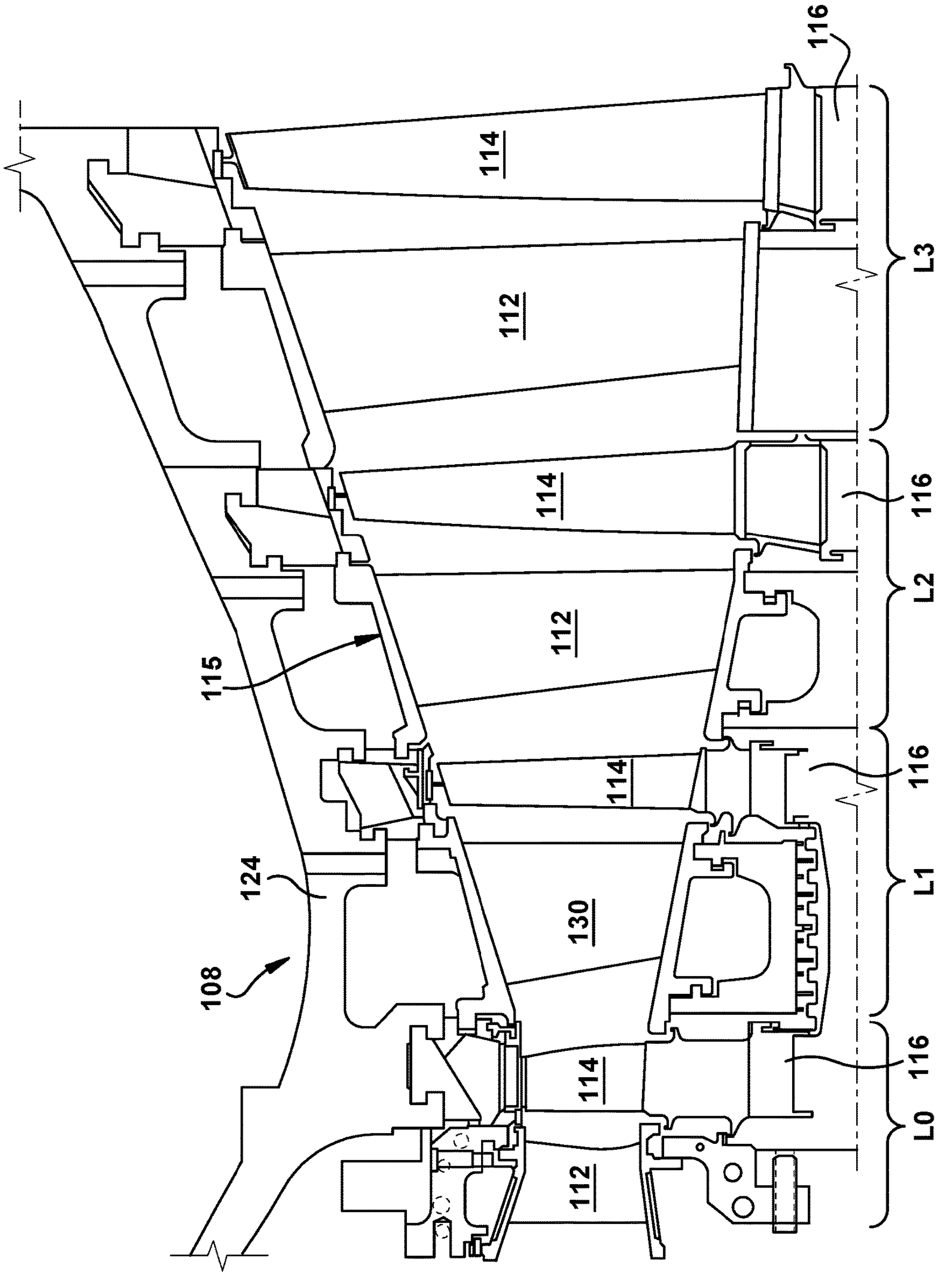
FIG. 2 shows a cross-sectional view of a portion of an illustrative turbine, according to embodiments of the disclosure.

FIG. 2 shows a cross-sectional view of an illustrative portion of turbine 108. In the example shown, turbine 108 includes four stages L0-L3 that may be used with GT system 100 in FIG. 1. The four stages are referred to as L0, L1, L2, and L3. Stage L0 is the first stage and is the smallest (in a radial direction) of the four stages. Stage L1 is the second stage and is disposed adjacent the first stage L0 in an axial direction. Stage L2 is the third stage and is disposed adjacent the second stage L1 in an axial direction. Stage L3 is the fourth, last stage and is the largest (in a radial direction). It is to be understood that four stages are shown as one example only, and each turbine may have more or less than four stages.

A plurality of stationary turbine vanes or nozzles 112 (hereafter "nozzle 112," or "nozzles 112") may cooperate with a plurality of rotating turbine blades 114 (hereafter "blade 114," or "blades 114") to form each stage L0-L3 of turbine 108 and to define a portion of a working fluid path through turbine 108. Blades 114 in each stage are coupled to rotor 110 (FIG. 1), e.g., by a respective rotor wheel 116 that couples them circumferentially to rotor 110 (FIG. 1). That is, blades 114 are mechanically coupled in a circumferentially spaced manner to rotor 110, e.g., by rotor wheels 116. A static nozzle section 115 includes a plurality of nozzles 112 mounted to a casing 124 and circumferentially spaced around rotor 110 (FIG. 1). It is recognized that blades 114 rotate with rotor 110 (FIG. 1) and thus experience centrifugal force, while nozzles 112 are static.

With reference to FIGS. 1 and 2, in operation, air flows through compressor 102, and pressurized air is supplied to combustor 104. Specifically, the pressurized air is supplied to fuel nozzle section 106 that is integral to combustor 104. Fuel nozzle section 106 is in flow communication with combustion region 105. Fuel nozzle section 106 is also in flow communication with a fuel source (not shown in FIG. 1) and channels fuel and air to combustion region 105. Combustor 104 ignites and combusts fuel to produce combustion gases. Combustor 104 is in flow communication with turbine 108, within which thermal energy from the combustion gas stream is converted to mechanical rotational energy by directing the combusted fuel (e.g., working fluid) into the working fluid path to turn blades 114. Turbine 108 is rotatably coupled to and drives rotor 110. Compressor 102 is rotatably coupled to rotor 110. At least one end of rotor 110 may extend axially away from compressor 102 or turbine 108 and may be attached to a load or machinery (not shown), such as, but not limited to, a generator, a load compressor, and/or another turbine.

Figure 3:
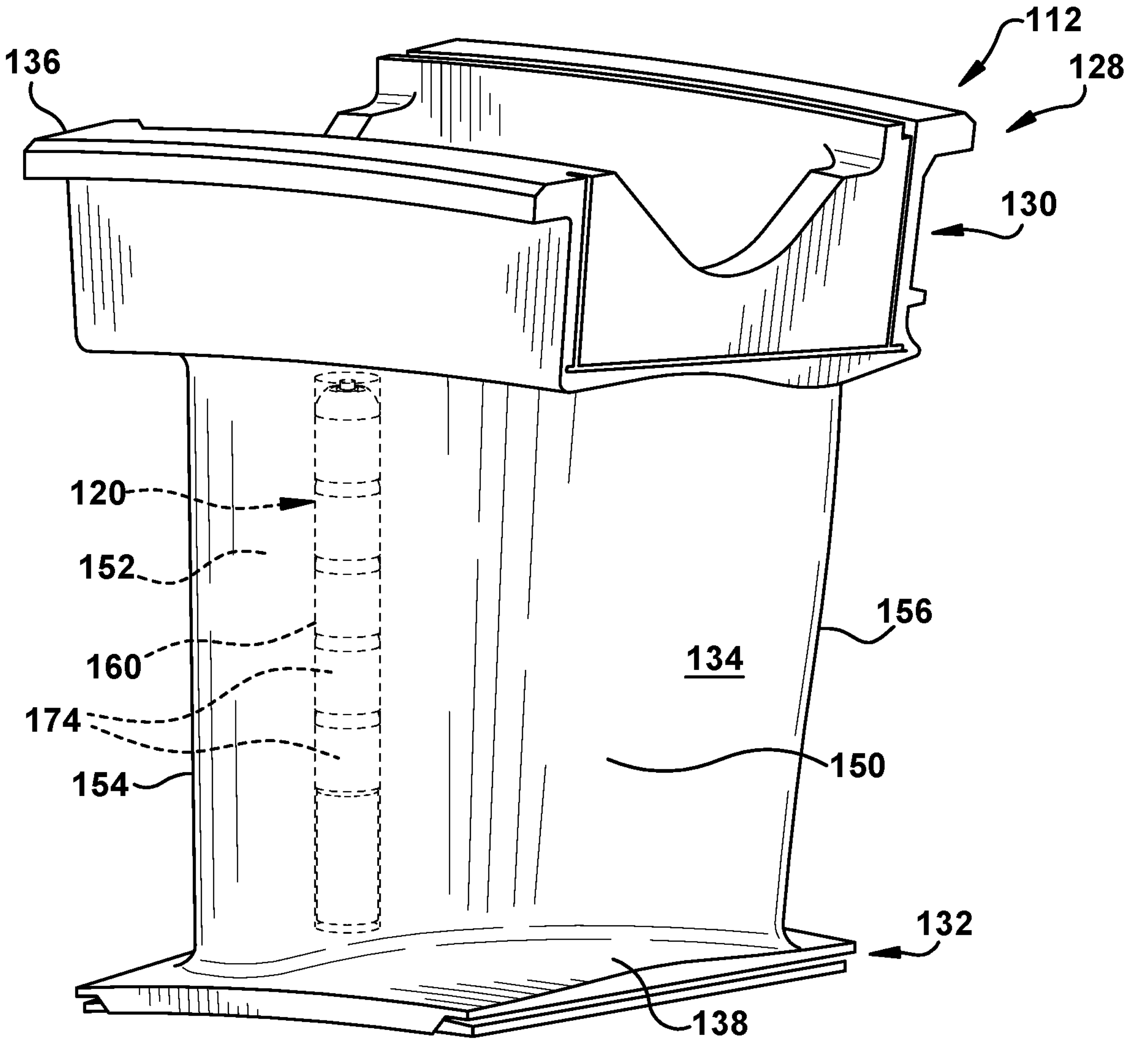
FIG. 3 shows a perspective view of an illustrative turbine nozzle including a vibration dampening system, according to embodiments of the disclosure.
Figure 4:
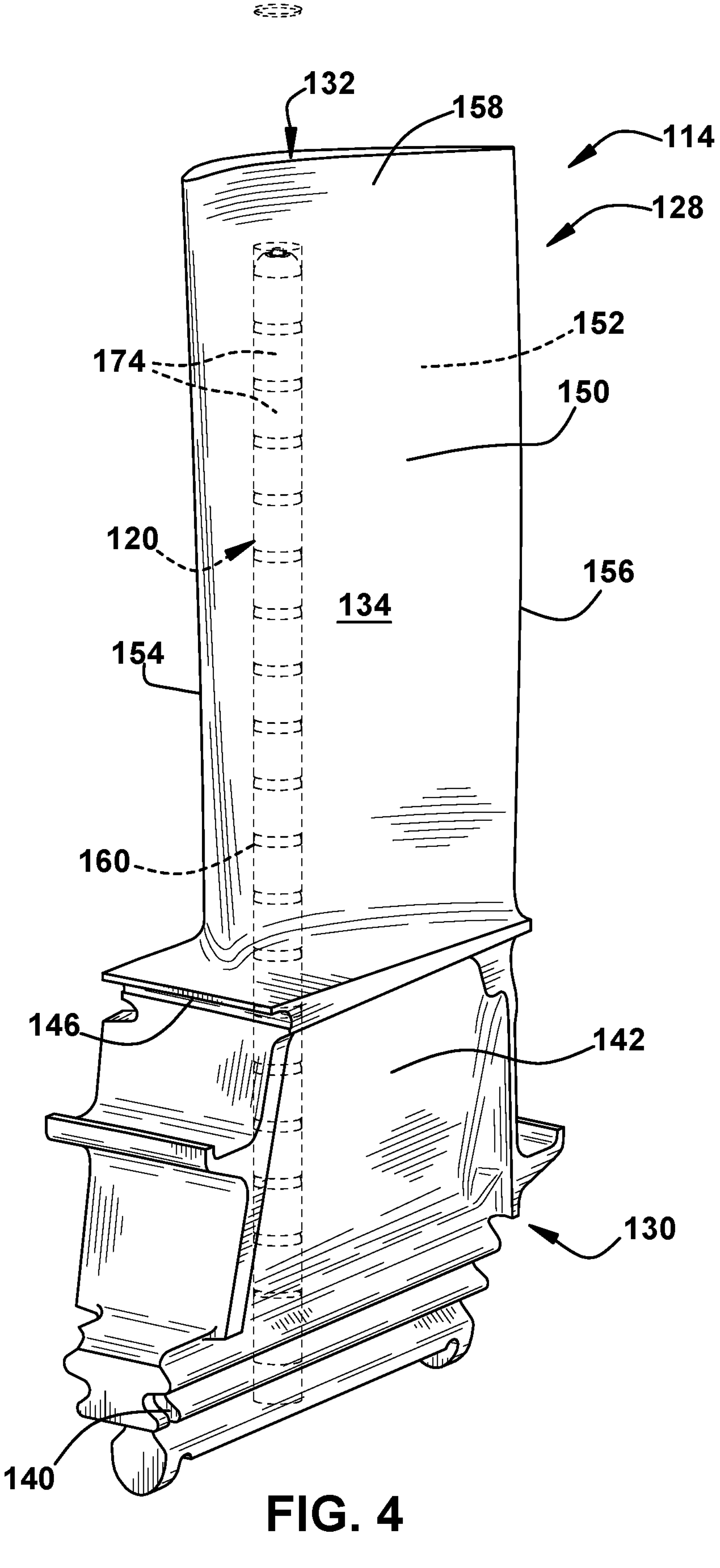
FIG. 4 shows a perspective view of an illustrative turbine blade including a vibration dampening system, according to embodiments of the disclosure.
Figure 5:
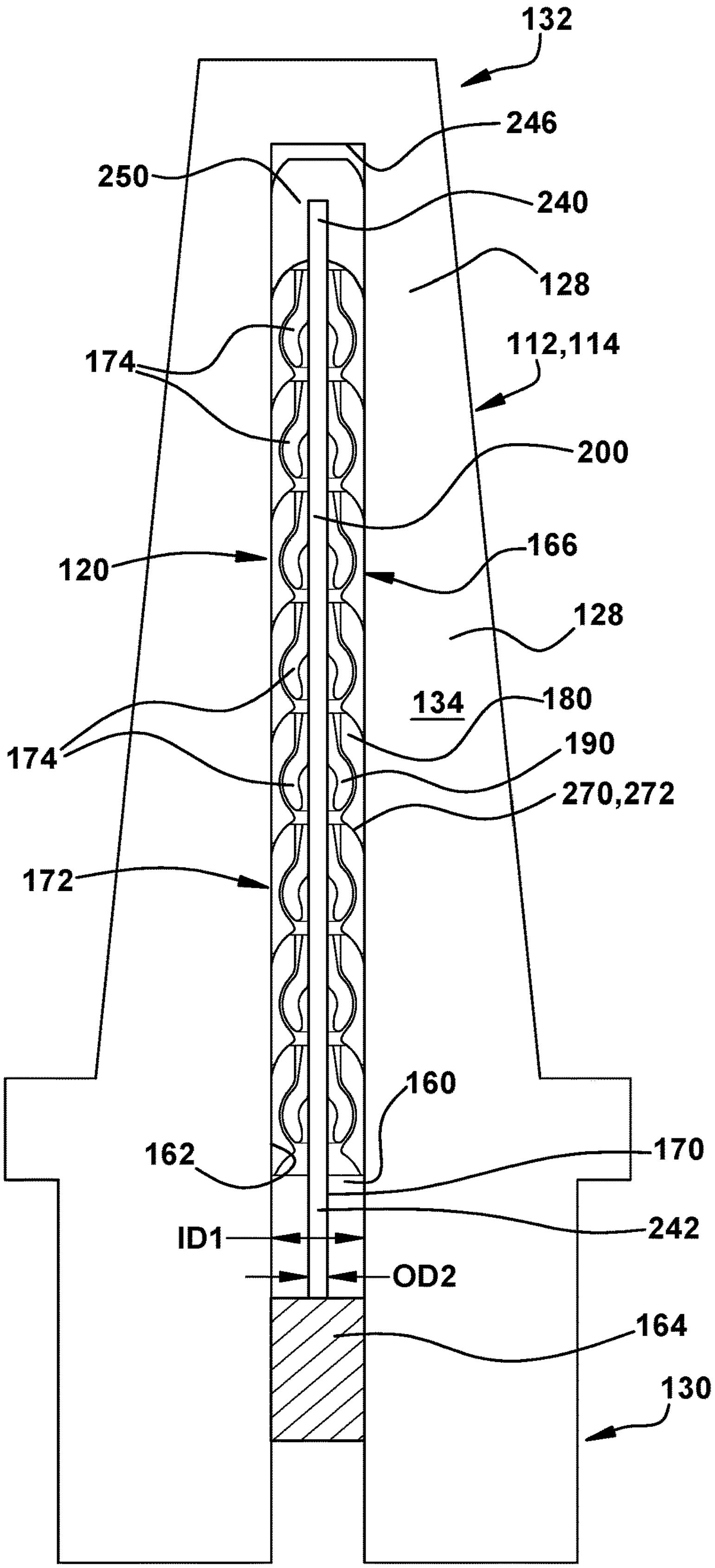
FIG. 5 shows a schematic cross-sectional view of a turbine nozzle or blade having a vibration dampening system including a vibration dampening element including a plurality of damper pins, according to embodiments of the disclosure.
Figure 6:
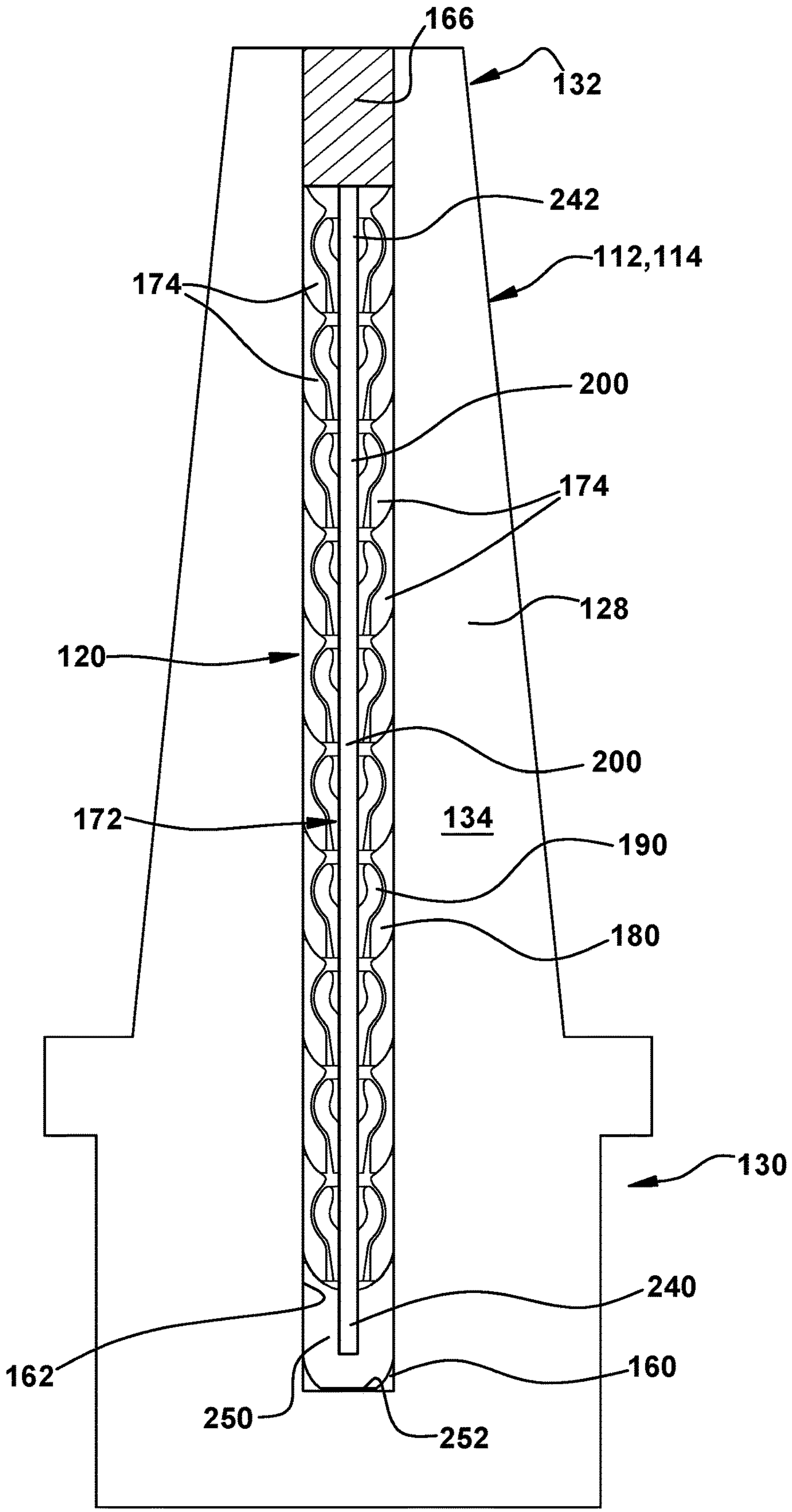
FIG. 6 shows a schematic cross-sectional view of a turbine nozzle or blade having a vibration dampening system including a vibration dampening element including a plurality of damper pins, according to embodiments of the disclosure.

FIGS. 3 and 4 show perspective views, respectively, of a (stationary) nozzle 112 and a (rotating) blade 114, of the type in which embodiments of a vibration dampening system 120 and a vibration dampening element 172 of the present disclosure may be employed. As will be described herein, FIGS. 5 and 6 show schematic cross-sectional views of a nozzle 112 or blade 114 including vibration dampening system 120, according to various embodiments of the disclosure.

Referring to FIGS. 3 and 4, each nozzle 112 or blade 114 includes a body 128 having a base end 130, a tip end 132, and an airfoil 134 extending between base end 130 and tip end 132. As shown in FIG. 3, nozzle 112 includes an outer endwall 136 at base end 130 and an inner endwall 138 at tip end 132. Outer endwall 136 couples to casing 124 (FIG. 2). As shown in FIG. 4, blade 114 includes a dovetail 140 at base end 130 by which blade 114 attaches to a rotor wheel 116 (FIG. 2) of rotor 110 (FIG. 2). Base end 130 of blade 114 may further include a shank 142 that extends between dovetail 140 and a platform 146. Platform 146 is disposed at the junction of airfoil 134 and shank 142 and defines a portion of the inboard boundary of the working fluid path (FIG. 2) through turbine 108.

It will be appreciated that airfoil 134 in nozzle 112 and blade 114 is the active component of the nozzle 112 or blade 114 that intercepts the flow of working fluid and, in the case of blades 114, induces rotor 110 (FIG. 1) to rotate. It will be seen that airfoil 134 of nozzle 112 and blade 114 include a concave pressure side (PS) outer sidewall 150 and a circumferentially or laterally opposite convex suction side (SS) outer sidewall 152 extending axially between opposite leading and trailing edges 154, 156, respectively. Sidewalls 150 and 152 also extend in the radial direction from base end 130 (i.e., outer endwall 136 for nozzle 112 and platform 146 for blade 114) to tip end 132 (i.e., inner endwall 138 for nozzle 112 and a tip end 158 for blade 114). Note, in the example shown, blade 114 does not include a tip shroud; however, teachings of the disclosure are equally applicable to a blade including a tip shroud at tip end 158. Nozzle 112 and blade 114 shown in FIGS. 3-4 are illustrative only, and the teachings of the disclosure can be applied to a wide variety of nozzles and blades.

During operation of a turbine, nozzles 112 or blades 114 may be excited into vibration by a number of different forcing functions. For example, variations in working fluid temperature, pressure, and/or density can excite vibrations throughout the rotor assembly, especially within the airfoils and/or tips of the blades 114 or nozzles 112. Gas exiting upstream of the turbine and/or compressor sections in a periodic, or "pulsating," manner can also excite undesirable vibrations. The present disclosure aims to reduce the vibration of a stationary nozzle 112 or rotating turbine blade 114 without significant change of nozzle or blade design.

FIGS. 5 and 6 each show a schematic cross-sectional view of nozzle 112 or blade 114 including vibration dampening system 120 according to embodiments of the disclosure. (Nozzle 112 in the schematic cross-sectional views of FIGS. 5-6 is shown flipped vertically compared to that shown in FIG. 3 and without inner endwall 138, for ease of description. It should be understood that references to base end 130 and tip end 132 may be reversed for nozzle 112, as compared to blade 114.) Vibration dampening system 120 for nozzle 112 or blade 114 may include a body opening 160 extending through body 128 between tip end 132 and base end 130 thereof and through airfoil 134. Body opening 160 may extend part of the distance between base end 130 and tip end 132, or it may extend through one or more of base end 130 or tip end 132. Body opening 160 may originate at base end 130 of blade 114 or may originate at tip end 132 of nozzle 112 (as shown in FIG. 3).

Body opening 160 may be defined in any part of any structure of body 128. For example, where body 128 includes an internal partition wall (not shown), for example, for defining a cooling circuit therein, body opening 160 may be defined as an internal cavity in the partition wall in body 128. Body opening 160 generally extends radially in body 128. However, some angling, and perhaps curving, of body opening 160 relative to a radial extent of body 128 is possible. Body opening 160 has an inner surface 162.

As shown for example in FIGS. 5 and 6, body opening 160 may be open in base end 130 and terminate in tip end 132, or, as shown in FIG. 6, it may be open in tip end 132 and extend into base end 130. The open end may assist in assembly of vibration dampening system 120 in nozzle 112 or blade 114 and may allow retrofitting of the system into an existing nozzle or blade. Where body opening 160 extends through base end 130 as shown in FIG. 5, a closure or fixture member 164 for closing body opening 160 may be provided. Where body opening 160 extends through tip end 132, as shown in FIG. 6, a closure or fixing member 166 for body opening 160 may be provided. Closure or fixing members 164, 166 may also be employed to close body opening 160. Alternatively, as will be described, closure or fixing members 164, 166 may close body opening 160 and mount an elongated body 200 in an operational state within body opening 160.

Vibration dampening system 120 for nozzles 112 or blades 114 may include a vibration dampening element 172 disposed in body opening 160. Vibration dampening element 172 may include a plurality of stacked damper pins 174. Hence, vibration dampening system 120 includes plurality of stacked damper pins 174. As shown in the enlarged cross-sectional view of FIG. 7, each damper pin 174 may include an outer body 180 having an inner opening 182. Outer body 180 may also include a first end surface 184 and an opposing second end surface 186.

Outer body 180 may have an outer surface 187 having a shape and dimension to fit within body opening 160. More particularly, body opening 160 has inner surface 162 having an inner dimension ID1, and each outer body 180 has an outer dimension OD1 sized to frictionally engage inner dimension ID1 of body opening 160 to damp vibration during motion of nozzle 112 or blade 114. That is, the outer dimension OD1 of outer body 180 of each damper pin 174 rubs against inner surface 162 of body opening 160 to dampen vibration, e.g., during movement of airfoil 134 of nozzle 112 or blade 114. During assembly, inner dimension ID1 and outer dimension OD1 are sized to allow damper pins 174 to be positioned in body opening 160. In one non-limiting example, a difference between outer dimension OD1 of damper pins 174 and inner dimension ID1 of inner surface 162 of body opening 160 may be in a range of approximately 0.04-0.06 millimeters (mm), which allows insertion of damper pins 174 but frictional engagement during use and relative movement of airfoil 134 of nozzle 112 or blade 114.

First end surface 184 and second end surface 186 of outer body 180 are complementary of one another, i.e., they fit together, so they can frictionally engage one another. In the FIGS. 5-7 embodiments, first end surface 184 of outer body 180 is at least partially concave, and second end surface 186 of outer body 180 is at least partially convex. In this manner, first end surface 184 and second end surface 186 of adjacent damper pins 174 can frictionally engage and rotationally move relative to one another as nozzle 112 or blade 114 moves.

Figure 8:
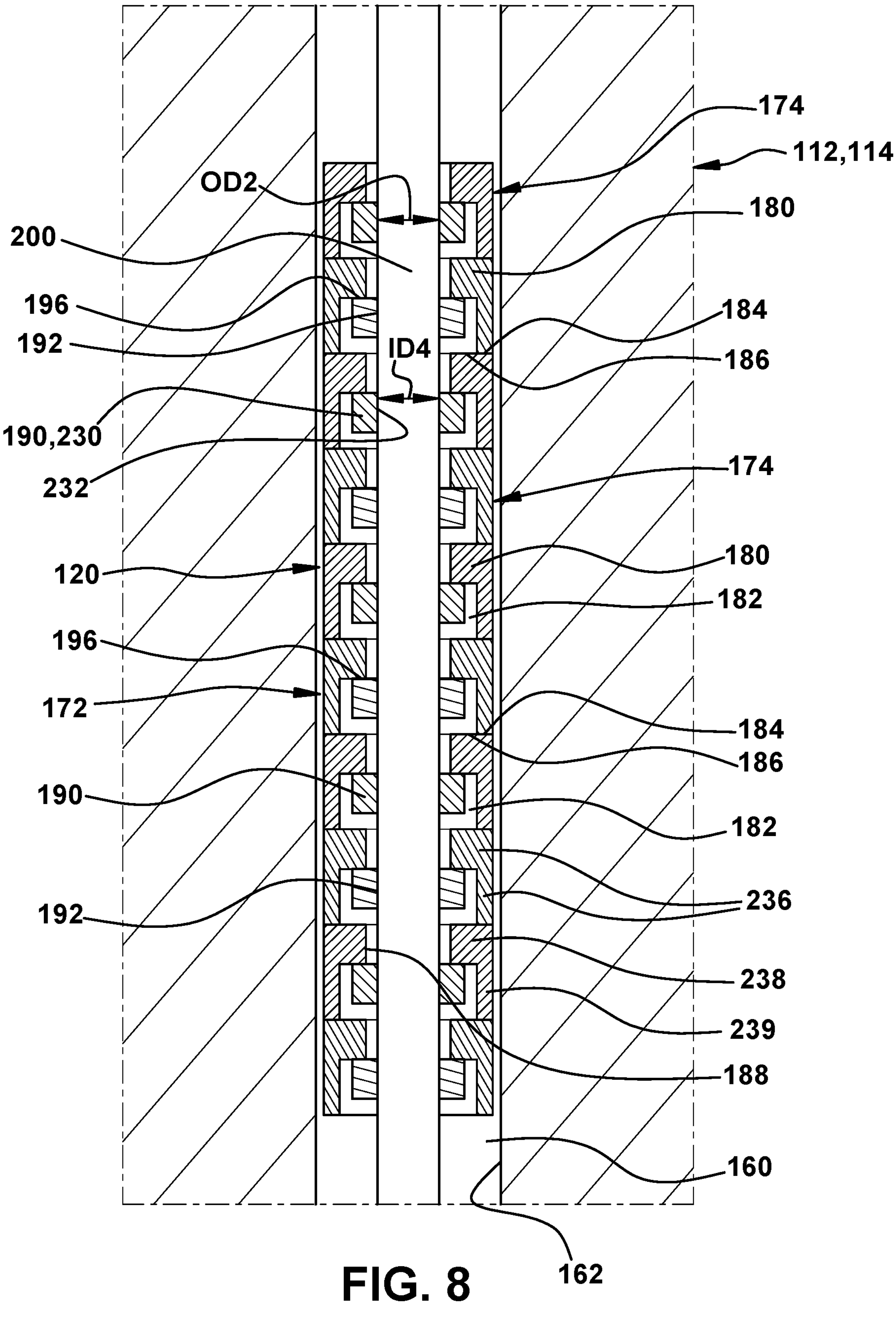
FIG. 8 shows a cross-sectional view of a damper pin including an outer body and an inner body, according to other embodiments of the disclosure.

In another embodiment, shown in the schematic cross-sectional view of FIG. 8, first end surface 184 of outer body 180 is planar, and second end surface 186 of outer body 180 is also planar. Here also, first end surface 184 and second end surface 186 of adjacent damper pins 174 can frictionally engage and slidingly move relative to one another as nozzle 112 or blade 114 moves. Other complementary shapes for end surfaces 184, 186 are also possible. Outer body 180 also includes a central opening 188 (part of inner opening 182) extending through first end surface 184 and second end surface 186. As will be described, central opening 188 is configured to allow an elongated body 200 to extend there-through and to allow pivoting movement of an inner body 190 within outer body 180.

Each damper pin 174 may also include an inner body 190 nested and movable within inner opening 182 of outer body 180. Inner body 190 has a central opening 192 including a first portion 194 configured to engage an elongated body 200 therein. Inner body 190 also includes an outer surface 196 configured to frictionally engage a portion 198 of inner opening 182 of outer body 180.

Inner body 190 and inner opening 182 of outer body 180 may take a variety of forms. In certain embodiments, shown in FIGS. 5-7, outer surface 196 of inner body 190 may have a pear shape. More particularly, outer surface 196 of inner body 190 may include a bulbous base portion 210 and a narrower neck portion 212. Bulbous base portion 210 and narrower neck portion 212 are integral to one another, i.e., it is a unitary structure. In the example shown in FIG. 7, narrower neck portion 212 includes a first portion 194 of central opening 192 of inner body 190. First portion 194 has an inner dimension ID2 configured to engage with an outer dimension OD2 of elongated body 200. Inner dimension ID2 allows sliding engagement with outer dimension OD2 of elongated body 200 (shown in FIG. 5). However, first portion 194 has sufficient (radial) length to mandate inner body 190 moves with elongated body 200, e.g., it tilts, pivot or otherwise moves under the influence of elongated body 200.

Bulbous base portion 210 includes a second portion 214 of central opening 192 of inner body 190 that has a larger inner dimension ID3 than inner dimension ID2 of first portion 194 of central opening 192 of inner body 190. Hence, second portion 214 of central opening 192 of inner body 190 is distanced from elongated body 200. Central opening 188 of outer body 180 is also distanced from inner body 190 of damper pin 174 and elongated body 200 at both end surfaces 184, 186. In this manner, second portion 214 of central opening 192 of inner body 190 allows pivoting movement of inner body 190 within outer body 180 under the influence of bending and/or moving of elongated body 200 as nozzle 112 or blade 114 vibrate.

Figure 9:
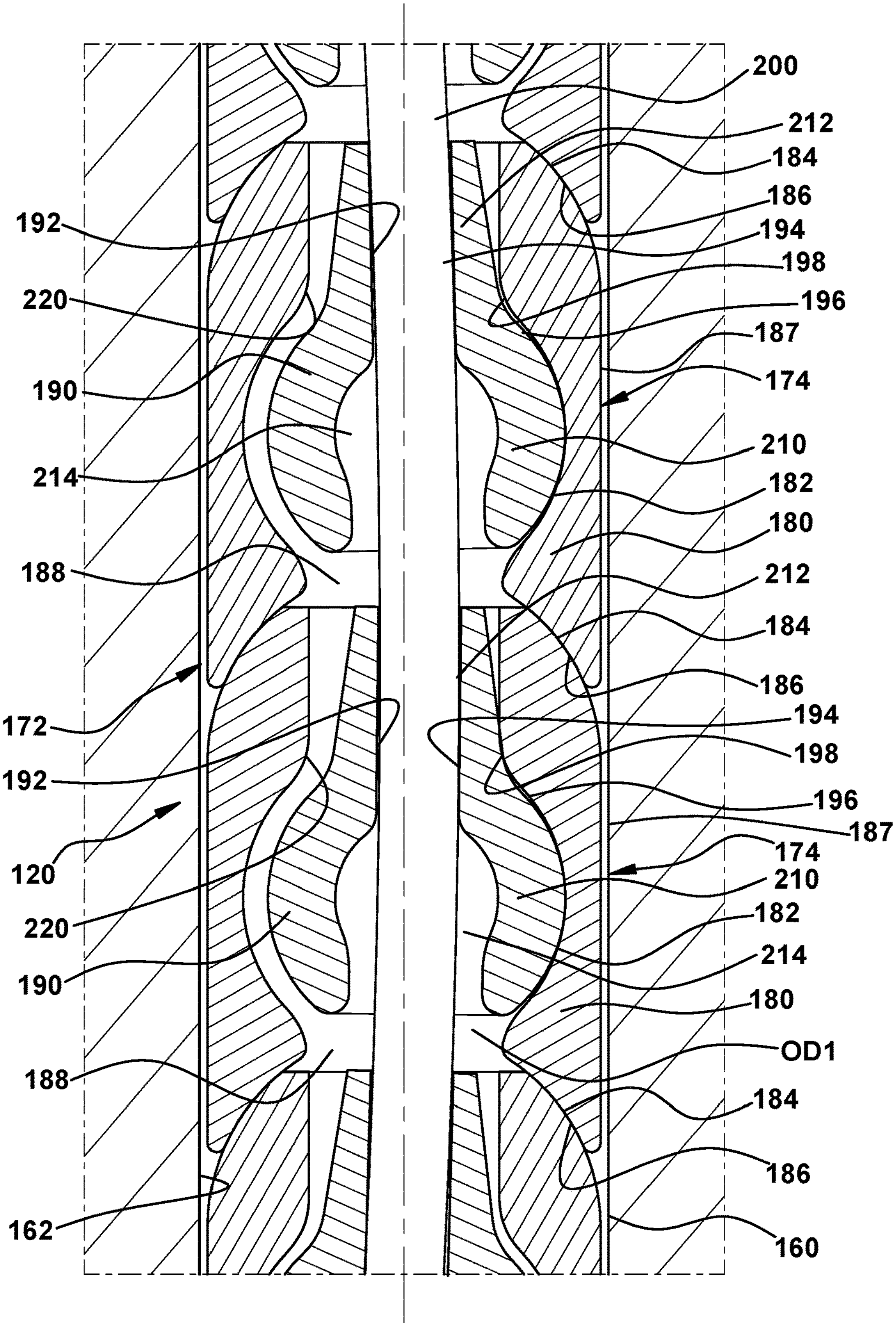
FIG. 9 shows a cross-sectional view of a damper pin with an inner body thereof in frictional engagement with an outer body thereof, according to embodiments of the disclosure.

Inner opening 182 of outer body 180 has a shape configured to receive the pear shape of outer surface 196 of inner body 190 and allow frictional engagement between inner body 190 and outer body 180 under the influence of elongated body 200 on inner body 190. As shown in FIG. 9, when elongated body 200 moves, e.g., bends with airfoil 134 during operation thereof, it imparts motion to inner body 190 via first portion 194 of central opening 192 of inner body 190, which can cause inner body 190 to rock or tilt relative to outer body 180. As this occurs, inner body 190 and outer body 180 frictionally engage one another to dampen vibration. The frictional engagement can occur anywhere along outer surface 196 of inner body 190 and inner opening 182 of outer body 180. For example, frictional engagement may occur near an upper portion (as illustrated on the page of FIG. 7) of bulbous base portion 210 and outer surface 196 of inner body 190 and a corner 220 of inner opening 182 of outer body 180 where it enlarges to match the pear shape of inner body 190. Frictional engagement can also occur anywhere along outer surface 196 of bulbous base portion 210 and/or narrower neck portion 212.

With further regard to FIG. 8, in certain embodiments, inner body 190 includes a planar washer member 230. Planar washer member 230 may include any plate having a central opening 232 therein. Central opening 232 of planar washer member 230 has an inner dimension ID4 configured to engage with outer dimension OD2 of elongated body 200, i.e., sliding engagement but forcing lateral pivoting with elongated body 200. Inner dimension ID4 allows sliding engagement with outer dimension OD2 of elongated body 200. However, planar washer member 230 has sufficient (radial) length to mandate that it moves with elongated body 200, e.g., it tilts, pivot or otherwise moves under the influence of elongated body 200. In this manner, inner body 190 (washer member 230) moves with elongated body 200 as nozzle 112 or blade 114 move.

In FIG. 8, outer body 180 includes a cup member 236 providing inner opening 182, which is configured to receive planar washer member 230. In one example, cup member 236 includes a base 238 and a tubular side 239 that collectively surround and encapsulate planar washer member 230 therein with an adjacent damper pin 174. Outer body 180 also includes first end surface 184 and second end surface 186 (surfaces of cup member 236), which are planar as previously noted. Inner body 190 and, more particularly, cup member 236 also includes central opening 188 (part of inner opening 182) through which elongated body 200 may freely pass. Inner body 190, including planar washer member 230, may frictionally engage with any part of inner opening 182 of outer body 180 to dampen vibration. Planar end surfaces 184, 186 of adjacent damper pins 174 also frictionally engage with one another to dampen vibrations. Outer body 180 (i.e., outer surface of cup member 236) is sized to slide into body opening 160, but also may frictionally engage with inner surface 162 of body opening 160 to dampen vibration during operation of nozzle 112 or blade 114. Elongated body 200 may also deflect during operation of nozzle 112 or blade 114 to dampen vibration. Any number of stacked damper pins 174 as in FIG. 8 may be employed in vibration dampening system 120 and vibration dampening element 172.

Vibration dampening system 120 and vibration dampening element 172 may include elongated body 200 extending within and fixed relative to body opening 160. Elongated body 200 extends through inner opening 182 of outer body 180 including central opening 188 in end surfaces 184, 186. Elongated body 200 also extends through second portion 214 of central opening 192 of inner body 190, and is slidingly engaged by first portion 194 of central opening 192 of inner body 190. More particularly, elongated body 200 extends in body opening 160 of nozzle 112 or blade 114 and is engaged within first portion 194 of central opening 192 of each inner body 190 of the plurality of stacked damper pins 174. As described previously, first portion 194 of central opening 192 of inner body 190 and elongated body 200 are sized and shaped such that inner body 190 slides freely on elongated body 200, but inner body 190 can be moved as elongated body 200 dictates. In this manner, each damper pin 174 may experience different movement by elongated body 200 and provide different vibration dampening through frictional engagement of outer body 180 and inner body 190.

As shown in FIGS. 5 and 6, elongated body 200 includes a first, free end 240 and a second end 242 fixed relative to base end 130 or tip end 132 (base end 130 in FIG. 5). Body opening 160 has inner dimension ID1 (FIG. 5) greater than a corresponding outer dimension OD2 (FIG. 5) of elongated body 200, allowing elongated body 200 a limited movement range within body opening 160 to dampen vibrations through deflection of elongated body 200 within body opening 160. That is, elongated body 200 may dampen vibration by deflection of elongated body 200 in body opening 160 as it extends radially between tip end 132 and base end 130 of body 128 of nozzle 112 or blade 114.

Elongated body 200 may have any length desired to provide a desired deflection and vibration dampening within nozzle 112 or blade 114 and to position any desired number of damper pins 174. Elongated body 200 may have any desired cross-sectional shape to provide free sliding of damper pins 174 thereon. For example, elongated body 200 and first portion 194 of central opening 192 of inner body 190 may have a circular or oval cross-sectional shape, i.e., they are cylindrical or rod shaped. However, other cross-sectional shapes are also possible. Elongated body 200 may be made of any material having the desired vibration resistance required for a particular application, e.g., a metal or metal alloy. In some embodiments, elongated body 200 may need to be very rigid or stiff, which could require alternative stiffer materials than metal or metal alloy such as, but not limited to, ceramic matrix composites (CMC). Elongated body 200 may include but is not limited to a solid rod, a cable (solid or woven), or a hollow rod.

In FIG. 5, second end 242 of elongated body 200 is fixed relative to base end 130 of body 128 of nozzle 112 or blade 114, and first, free end 240 extends towards tip end 132. In FIG. 5, plurality of damper pins 174 may be retained in body opening 160 by, among other things, abutting an end 246 of body opening 160. In addition, or as an alternative, a retention damper pin 250 may be positioned on an end of elongated body 200 to engage with an endmost one of the plurality of stacked damper pins 174. That is, FIG. 5 shows an embodiment in which a retention damper pin 250 is positioned on first, free end 240 of elongated body 200 to prevent plurality of stacked damper pins 174 from moving relative to a length of elongated body 200. Here, damper pins 174 may alternatively abut retention damper pin 250 rather than end 246 of body opening 160. Retention damper pin 250 is fixed to first, free end 240 of elongated body 200 and can be a unitary, single body, i.e., with no inner and outer body. Retention damper pin 250 can have any shape or size to prevent damper pins 174 from sliding off elongated body 200. Other retention elements than one shaped like a damper pin may also be employed. Centrifugal force on blade 114 will force stack of damper pins 174 against retention damper pin 250 and/or end 246 of body opening 160 in tip end 132 of body 128 of turbine blade 114 as the blade rotates. Similarly, the weight of damper pins 174 will force them against retention damper pin 250 on elongated body 200 in tip end 132, and/or against end 246 of body opening 160 in tip end 132, in stationary nozzle 112 during use. Body opening 160 in base end 130 may be closed by any now known or later developed closure or fixing member 164.

FIG. 6 shows a schematic cross-sectional view of nozzle 112 or blade 114 including vibration dampening system 120 according to other embodiments of the disclosure. In FIG. 6, second end 242 of elongated body 200 is fixed relative to tip end 132 of body 128, and first, free end 240 extends towards base end 130. Here, centrifugal force on blade 114 will force stack of damper pins 174 against closure or fixing member 166 in tip end 132 of body 128 of turbine blade 114 as the blade rotates. Similarly, the weight of damper pins 174 will force them against retention damper pin 250 on elongated body 200 in base end 130, and/or against an inner end 252 of body opening 160 in base end 130, in stationary nozzle 112 during use. Body opening 160 in tip end 132 may be closed by any now known or later developed closure or fixing member 166, which also fixes second end 242 of elongated body 200.

In FIGS. 5 and 6, second end 242 of elongated body 200 may be fixed in any now known or later developed manner. In one example, shown in FIG. 6, where used in turbine blade 114, second end 242 can be fixed by radial loading during operation of turbine 108 (FIGS. 1-2), i.e., by centrifugal force. In another example, second end 242 may be physically fixed, e.g., by fastening using couplers, fasteners, and/or welding. For example, elongated body 200 may include second end 242 that may be physically fixed in tip end 130 or base end 132, e.g., in the actual end 130 or 132 or in closure or fixing member 166, by threaded fasteners.

Figure 10:
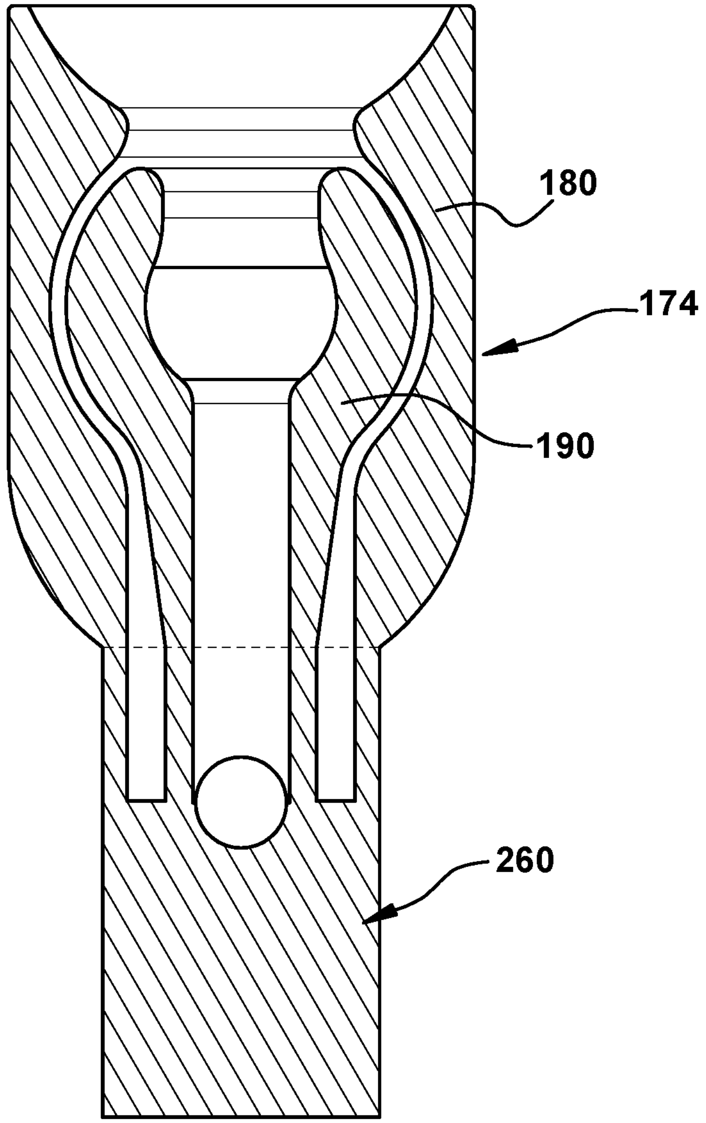
FIG. 10 shows a cross-sectional view of an additively manufactured damper pin, according to embodiments of the disclosure.

Damper pins 174 can be manufactured in any now known or later developed fashion. For example, outer and inner bodies 180, 190 can be cast, with outer body 180 in halves, and the parts can be assembled, e.g., by welding or otherwise fastening of the halves of outer body 180 positioned about inner body 190. Referring to FIG. 10, in one embodiment, outer body 180 and inner body 190 can be additively manufactured. Any form of additive manufacture appropriate for the materials used can be employed, such as but not limited to direct metal laser melting (DMLM). In this case, prior to separation after the additive manufacturing, outer body 180 and inner body 190 are integrally coupled and fixed relative to one another by a removable coupling element 260. In this manner, outer body 180 can be additively manufactured with and about inner body 190 with each of outer body 180 and inner body 190 being formed as a single, unitary body. Coupling element 260 can then be removed using any method (e.g., by cutting at the dashed line shown in FIG. 10), resulting in inner body 190 being nested in and movable within outer body 180, as described herein.

Figure 7:
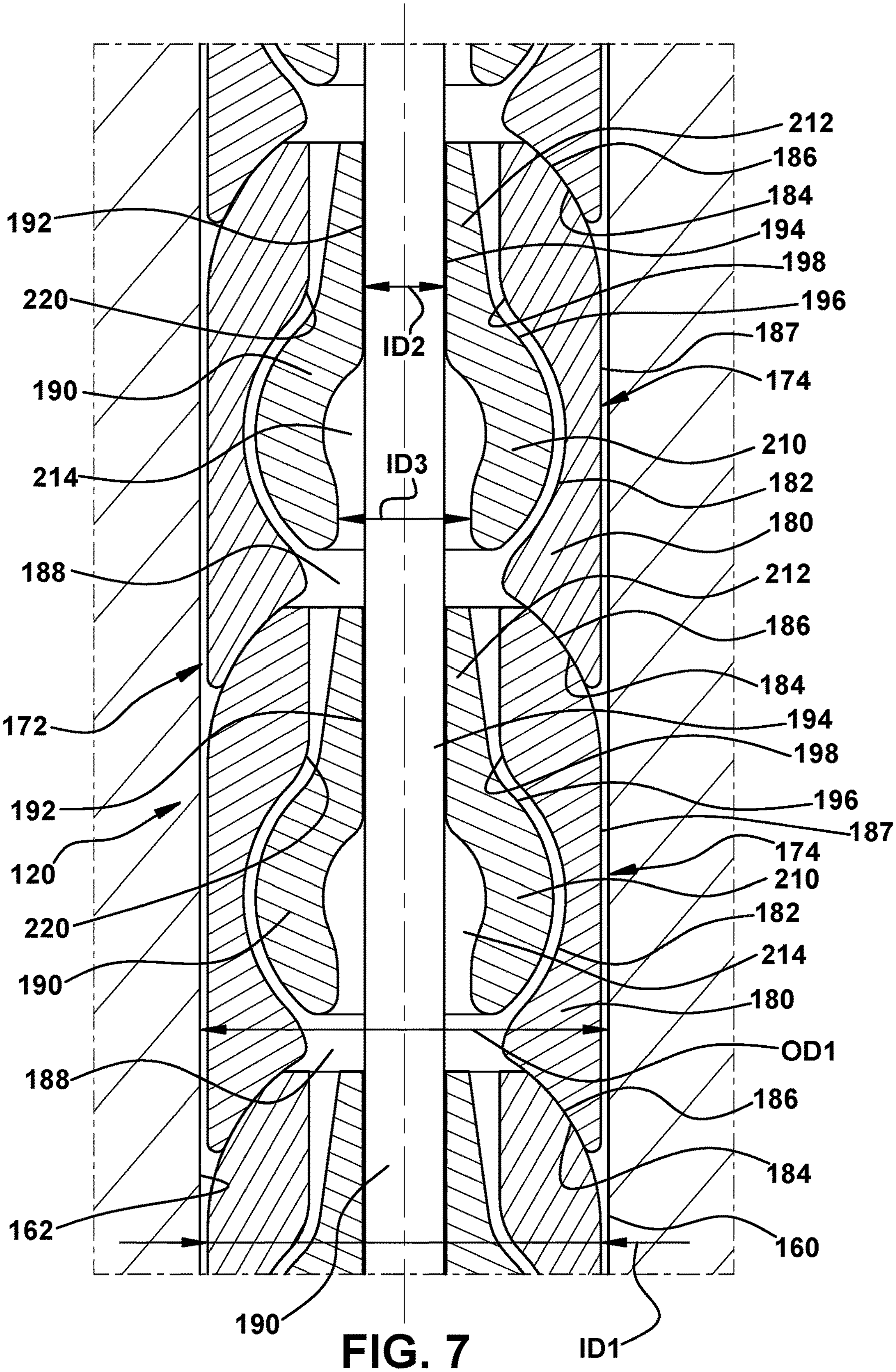
FIG. 7 shows a cross-sectional enlarged view of a pair of damper pins each including an outer body and an inner body, according to embodiments of the disclosure.

In operation, a method of dampening vibration in turbine nozzle 112 or blade 114 may include, during operation of nozzle 112 or blade 114, a number of vibration dampening processes. Dampening vibration may occur by frictional engagement between and within a plurality of stacked damper pins 174. As noted, each damper pin 174 includes outer body 180 having inner opening 182, first end surface 184 and opposing second end surface 186. Vibration dampening occurs by frictional engagement of first end surface 184 and opposing second end surface 186 of adjacent damper pins 174. In FIGS. 5-7, complementary concave-convex end surfaces 184, 186 frictionally engage, and in FIG. 8, complementary planar end surfaces 184, 186 frictionally engage, to dampen vibration. As noted, end surfaces 184, 186 may have other complementary shapes allowing frictional engagement to dampen vibration.

Each damper pin 174 also includes inner body 190 nested and movable within inner opening 182 of outer body 180. Additional vibration dampening occurs by frictional engagement of a portion of outer surface 196 of inner body 190 and a portion 198 of inner opening 182 of outer body 180 under influence of elongated body 200 engaged with inner body 190. Further vibration dampening may occur by deflection of elongated body 200 disposed radially in body opening 160 extending in body 128 of nozzle 112 or blade 114.

Vibration dampening also may occur by frictional engagement of an outer dimension OD1 of outer surface 187 of outer body 180 with inner dimension ID1 of inner surface 162 of body opening 160 in nozzle 112 or blade 114.

Embodiments of the disclosure provide various technical and commercial advantages, examples of which are discussed herein. Vibration dampening system 200 reduces nozzle or blade vibration with a simple arrangement and does not add much extra mass to nozzle 112 or blade 114. Vibration dampening element 172 does not increase centrifugal force to nozzle 112 base end 130 or blade 114 tip end 132 or require a change in nozzle 112 or blade 114 configuration. In turbine blade 114, the nested damper pins 174 allow use of stacked damper pins in which inner bodies 190 are free to continue frictional-based vibration dampening movement (via interaction with elongated body 200) even if outer bodies 180 lock together from centrifugal forces, e.g., at end surfaces 184, 186.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately," as applied to a particular value of a range, applies to both end values and, unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and their practical application and to enable others of ordinary skill in the art to understand the disclosure for various embodiments with various modifications as are suited to the particular use contemplated.

What is claimed is:

1. A damper pin for a vibration dampening system for a turbine nozzle or blade, the damper pin comprising:

an outer body having an inner opening, a first end surface and an opposing second end surface; and an inner body nested and movable within the inner opening of the outer body, the inner body having a first central opening including a first portion configured to engage an elongated body therein and an outer surface configured to frictionally engage a portion of the inner opening of the outer body, wherein the first end surface of the outer body is at least partially concave, and the second end surface of the outer body is at least partially convex, and wherein the first end surface and the second end surface are configured such that, when a plurality of the damper pins are stacked, the first end surface of one of the damper pins frictionally engages with the second end surface of an adjacent one of the damper pins.

2. The damper pin of claim 1, wherein the outer surface of the inner body has a pear shape including a bulbous base portion and a narrower neck portion, wherein the narrower neck portion includes the first portion of the first central opening.

3. The damper pin of claim 2, wherein the bulbous base portion includes a second portion of the first central opening, the second portion configured to be distanced from the elongated body when the elongated body is received by the inner body.

4. The damper pin of claim 2, wherein the inner opening of the outer body has a shape configured to receive the pear shape of the outer surface of the inner body and to allow frictional engagement between the inner body and the outer body under influence of the elongated body on the inner body when the elongated body is received by the inner body.

5. The damper pin of claim 1, wherein the outer body further includes a second central opening extending through the first end surface and the second end surface, the second central opening being configured to allow the elongated body to extend therethrough.

6. The damper pin of claim 1, wherein the outer body and the inner body are additively manufactured, and wherein, prior to separation after the additive manufacturing, the outer body and the inner body are integrally coupled and fixed relative to one another by a removable coupling element.

7. A damper pin for a vibration dampening system for a turbine nozzle or blade, the damper pin comprising:

an outer body having an inner opening, a first end surface and an opposing second end surface; and an inner body nested and movable within the inner opening of the outer body, the inner body having a first central opening including a first portion configured to engage an elongated body therein and an outer surface configured to frictionally engage a portion of the inner opening of the outer body, wherein the inner body includes a planar washer member, and the outer body includes a cup member configured to receive the planar washer member, and wherein the first end surface and the second end surface are configured such that, when a plurality of the damper pins are stacked, the first end surface of one of the damper pins frictionally engages with the second end surface of an adjacent one of the damper pins.

8. A vibration dampening system for a turbine nozzle or blade, the vibration dampening system comprising:

a plurality of stacked damper pins, each damper pin including:

an outer body having an inner opening, a first end surface and an opposing second end surface; and an inner body nested and movable within the inner opening of the outer body, the inner body having a first central opening and an outer surface configured to frictionally engage a portion of the inner opening of the outer body; and an elongated body extending in a body opening of the turbine nozzle or blade and engaged within a first portion of the first central opening of each inner body, wherein the first end surface and the second end surface of adjacent damper pins of the plurality of stacked damper pins frictionally engage.

9. The vibration dampening system of claim 8, wherein the outer surface of each inner body has a pear shape including a bulbous base portion and a narrower neck portion, wherein the narrower neck portion includes the first portion of the first central opening.

10. The vibration dampening system of claim 9, wherein each bulbous base portion includes a second portion of the first central opening, the second portion distanced from the elongated body.

11. The vibration dampening system of claim 9, wherein the inner opening of each outer body has a shape configured to receive the pear shape of the outer surface of the inner body and to allow frictional engagement between the inner body and the outer body under influence of the elongated body on the inner body.

12. The vibration dampening system of claim 8, wherein each outer body further includes a second central opening extending through the first end surface and the second end surface, the second central opening being configured to allow the elongated body to extend therethrough.

13. The vibration dampening system of claim 8, wherein each outer body and inner body are additively manufactured, and wherein, prior to separation after the additive manufacturing, one of the outer bodies and one of the inner bodies are integrally coupled and fixed relative to one another by a removable coupling element.

14. The vibration dampening system of claim 8, further comprising a retention damper pin on an end of the elongated body, the retention damper pin engaging with an endmost one of the plurality of stacked damper pins.

15. The vibration dampening system of claim 8, wherein each inner body includes a planar washer member, and each outer body includes a cup member configured to receive the planar washer member.

16. A method of dampening vibration in a turbine nozzle or blade, the method comprising:

during operation of the turbine nozzle or blade, dampening vibration by frictional engagement between and within a plurality of stacked damper pins, each damper pin including:

an outer body having an inner opening, a first end surface and an opposing second end surface, wherein first vibration dampening occurs by frictional engagement of the first end surface and the opposing second end surface of adjacent damper pins; and an inner body nested and movable within the inner opening of the outer body, wherein second vibration dampening occurs by frictional engagement of a portion of an outer surface of the inner body and a portion of the inner opening of the outer body under influence of an elongated body engaged with the inner body.

17. The method of claim 16, further comprising third vibration dampening by deflection of the elongated body disposed radially in a body opening extending in a body of the turbine nozzle or blade.

18. The method of claim 17, further comprising fourth vibration dampening by frictional engagement of an outer dimension of at least one of the outer bodies with an inner dimension of an inner surface of the body opening in the turbine nozzle or blade.

* * * * *